US012628156B2

(12) United States Patent
Kurita et al.

(10) Patent No.: US 12,628,156 B2
(45) Date of Patent: May 12, 2026

(54) TERMINAL AND METHOD FOR CONTROLLING REPETITION OF UPLINK CONTROL CHANNEL

(71) Applicant: NTT DOCOMO, INC., Tokyo (JP)

(72) Inventors: Daisuke Kurita, Tokyo (JP); Hiroki Harada, Tokyo (JP); Shohei Yoshioka, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 715 days.

(21) Appl. No.: 17/802,835

(22) PCT Filed: Feb. 28, 2020

(86) PCT No.: PCT/JP2020/008459
§ 371 (c)(1),
(2) Date: Aug. 26, 2022

(87) PCT Pub. No.: WO2021/171594
PCT Pub. Date: Sep. 2, 2021

(65) Prior Publication Data
US 2023/0010322 A1    Jan. 12, 2023

(51) Int. Cl.
*H04W 72/12*    (2023.01)
*H04L 1/08*    (2006.01)
*H04W 16/28*    (2009.01)
*H04W 72/1268*    (2023.01)

(52) U.S. Cl.
CPC ........... *H04W 72/1268* (2013.01); *H04L 1/08* (2013.01); *H04W 16/28* (2013.01)

(58) Field of Classification Search
CPC . H04W 72/1268; H04W 72/12; H04W 72/14; H04W 16/28; H04W 72/126; H04L 1/08; H04L 1/0061; H04L 1/006
See application file for complete search history.

(56) References Cited

U.S. PATENT DOCUMENTS

| | | | | |
|---|---|---|---|---|
| 10,666,334 | B2 * | 5/2020 | Xiong ................. | H04B 7/0695 |
| 2018/0146438 | A1 | 5/2018 | Yi et al. | |
| 2018/0220415 | A1 * | 8/2018 | Yin ...................... | H04L 5/0094 |
| 2019/0098622 | A1 | 3/2019 | Lee et al. | |
| 2019/0313342 | A1 | 10/2019 | Papasakellariou | |
| 2020/0008189 | A1 | 1/2020 | Yin et al. | |
| 2021/0168779 | A1 * | 6/2021 | Mondal ................. | H04L 5/0053 |
| 2022/0287075 | A1 * | 9/2022 | Ying .................... | H04L 1/1893 |

FOREIGN PATENT DOCUMENTS

| | | |
|---|---|---|
| JP | 2018515987 A | 6/2018 |
| JP | 2019510441 A | 4/2019 |

OTHER PUBLICATIONS

International Search Report issued in PCT/JP2020/008459 on Oct. 13, 2020 (2 pages).

(Continued)

*Primary Examiner* — Wei Zhao
(74) *Attorney, Agent, or Firm* — Osha Bergman Watanabe & Burton LLP

(57) ABSTRACT

A terminal transmits an uplink control channel corresponding to an antenna beam transmitted from a radio base station. The terminal assumes a symbol location of a repetition of the uplink control channel based on an explicit or implicit notification.

3 Claims, 15 Drawing Sheets

(56)                 References Cited

OTHER PUBLICATIONS

Written Opinion of the International Searching Authority issued in PCT/JP2020/008459 on Oct. 13, 2020 (3 pages).

China Telecom; "New SID on NR coverage enhancement"; 3GPP TSG RAN Meeting #86, RP-193240; Sitges, Spain; Dec. 9-12, 2019 (12 pages).

Office Action issued in Japanese Patent Application No. 2024-074732, issued Mar. 11, 2025 (6 pages).

Office Action issued in Japanese Patent Application No. 2024-074732, mailed on Aug. 5, 2025 (4 pages).

* cited by examiner

FIG. 2

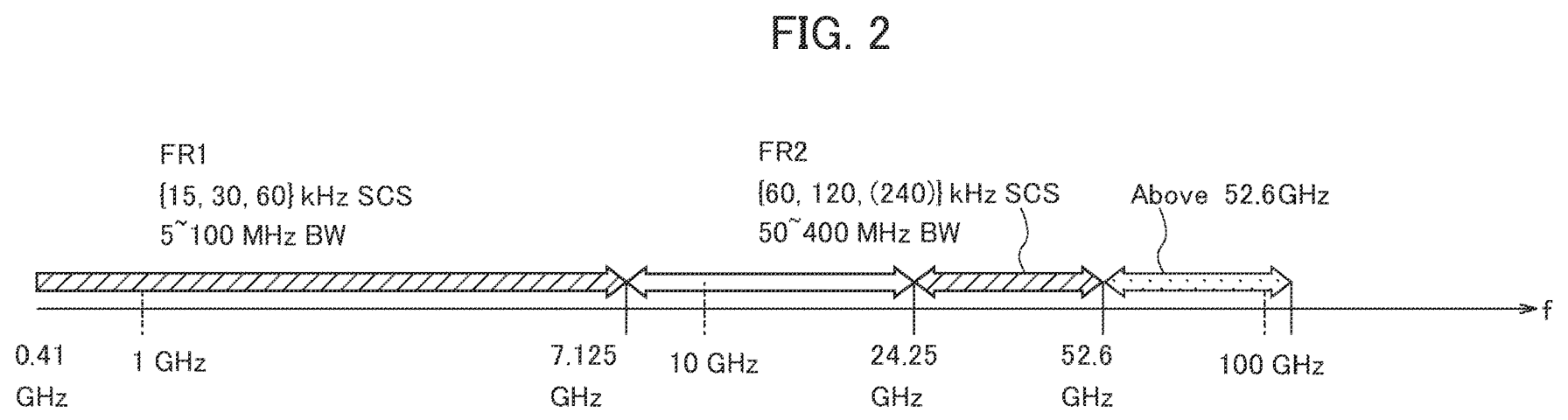

FR1
{15, 30, 60} kHz SCS
5~100 MHz BW

FR2
{60, 120, (240)} kHz SCS
50~400 MHz BW

Above 52.6GHz 0.41
GHz

1 GHz 7.125
GHz

10 GHz 24.25
GHz 52.6
GHz

100 GHz f

FIG. 5
PUCCH repetition
(Rel-15/Rel-16)
PUCCH format 1/3/4 repetition
 -Consecutive slots
 -Same number of consecutive symbols
 -Supports frequency hopping per slot
PUCCH format 0/2
 -doesn't support repetition
PF 1/3/4
PUCCH
PF 0/2
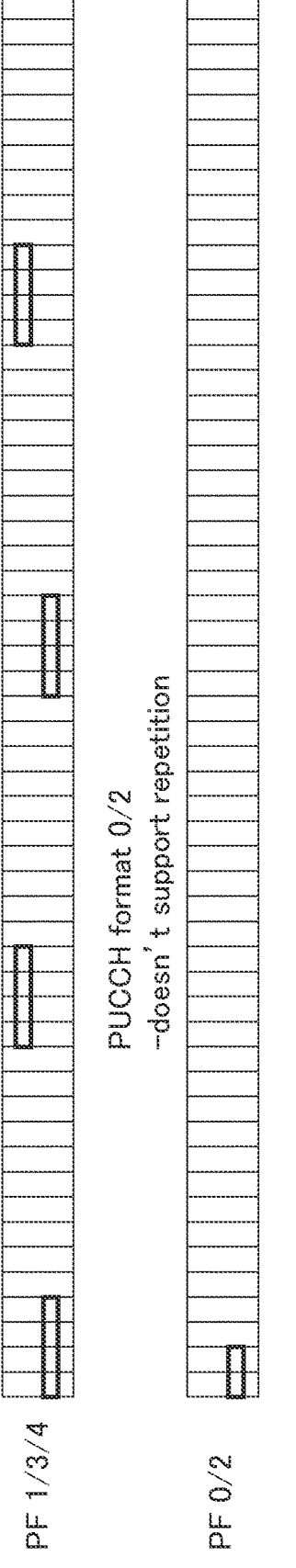
Example of PUCCH mapping
(8 BS antenna beams)
PF 1/3/4
PUCCH (#0)    PUCCH (#7)
PF 0/2
0    #7

FIG. 10

```
-- ASN1START
-- TAG-PUCCH-CONFIG-START

PUCCH-Config ::=                         SEQUENCE [
    resourceSetToAddModList              SEQUENCE (SIZE (1..maxNrofPUCCH-ResourceSets)) ···
...
PUCCH-Resource ::=                       SEQUENCE [
    pucch-ResourceId                     PUCCH-ResourceId,
    startingPRB                          PRB-Id,
    startingSymbolIndexforRepetition         INTEGER(0..10),
    slotOffset                               INTEGER(0..7),
    startingSymbolIndexforRepetition1        INTEGER(0..10),
    slotOffset1                              INTEGER(0..7),
    startingSymbolIndexforRepetition2        INTEGER(0..10),
    slotOffset2                              INTEGER(0..7),
    startingSymbolIndexforRepetition3        INTEGER(0..10),
    slotOffset3                              INTEGER(0..7),
    intraSlotFrequencyHopping            ENUMERATED [ enabled ]
    secondHopPRB                         PRB-Id
    format                               CHOICE [
        format0                              PUCCH-format0,
        format1                              PUCCH-format1,
        format2                              PUCCH-format2,
        format3                              PUCCH-format3,
        format4                              PUCCH-format4
    }
}
...
PUCCH-format1 ::=                        SEQUENCE [
    initialCyclicShift                       INTEGER(0..11),
    nrofSymbols                              INTEGER (4..14),
    startingSymbolIndex                      INTEGER(0..10),
    startingSymbolIndexforRepetition         INTEGER(0..10),
    slotOffset                               INTEGER(0..7),
    startingSymbolIndexforRepetition1        INTEGER(0..10),
    slotOffset1                              INTEGER(0..7),
    startingSymbolIndexforRepetition2        INTEGER(0..10),
    slotOffset2                              INTEGER(0..7),
    startingSymbolIndexforRepetition3        INTEGER(0..10),
    slotOffset3                              INTEGER(0..7),
    timeDomainOCC                            INTEGER(0..6)
}
...

-- TAG-PUCCH-CONFIG-STOP
-- ASN1STOP
```

FIG. 11

-Repetition1
-Start symbol index : startingSymbolIndex+{A mod 14}
-nrofSymbols : 4
-Slot #n+C -StartingSymbolIndex : 4
-nrofSymbols : 4
-Slot #n -ssb-PositionsinBurst." 11111111"{number of Antenna Beams=8}
-nrofSlots : n2

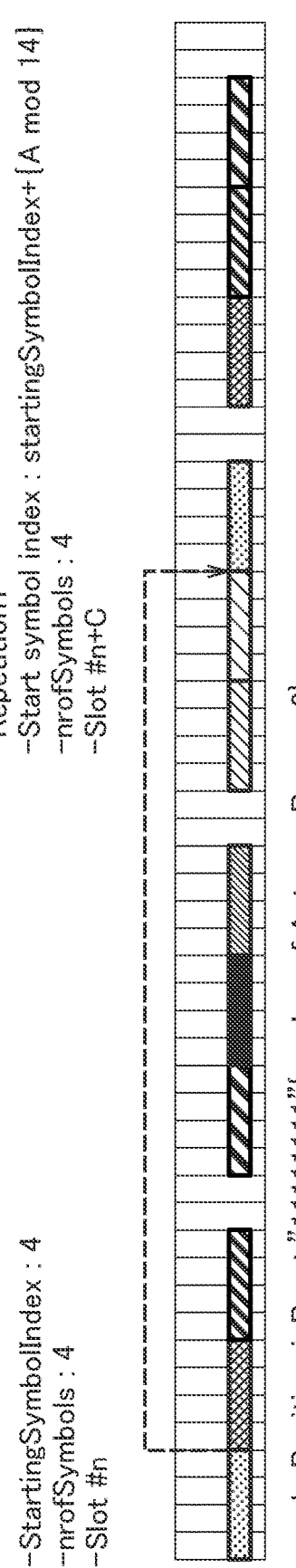

A:Number of symbols between #n and #n+1 PUCCH
=nrofSymbols × number of Antenna Beams +B×C B:Number of symbols where PUCCH is not configured
=14 mod nrofSymbols C:Number of B within A = floor(E/D)

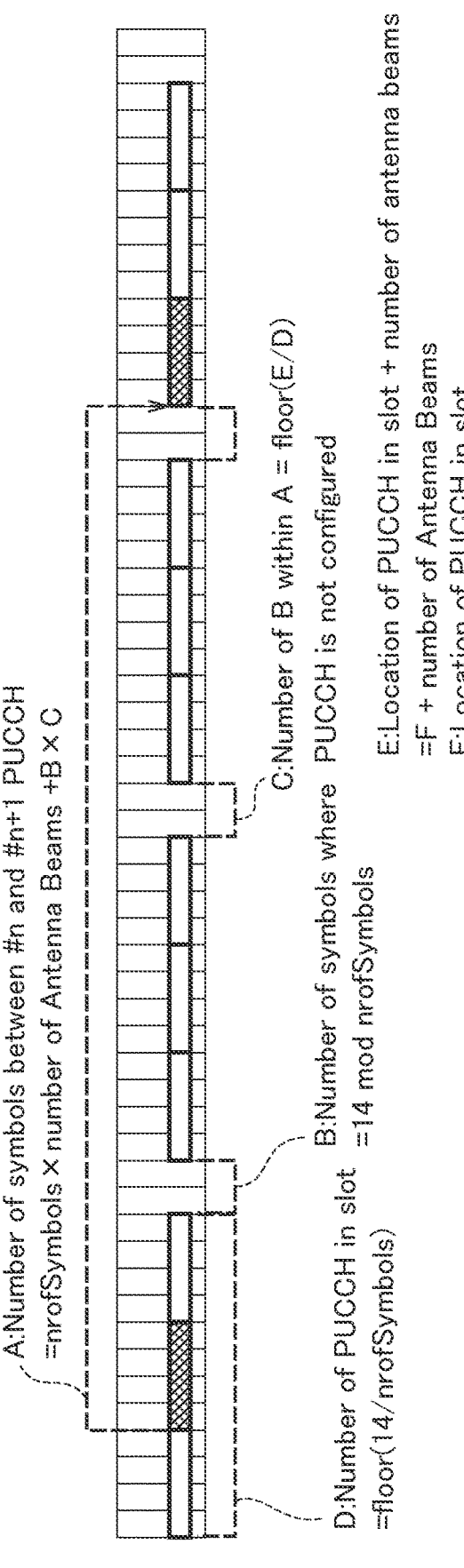

D:Number of PUCCH in slot
=floor(14/nrofSymbols)

E:Location of PUCCH in slot + number of antenna beams
=F + number of Antenna Beams F:Location of PUCCH in slot
=floor {startingSymbolIndex / nrofSymbols}

FIG. 14

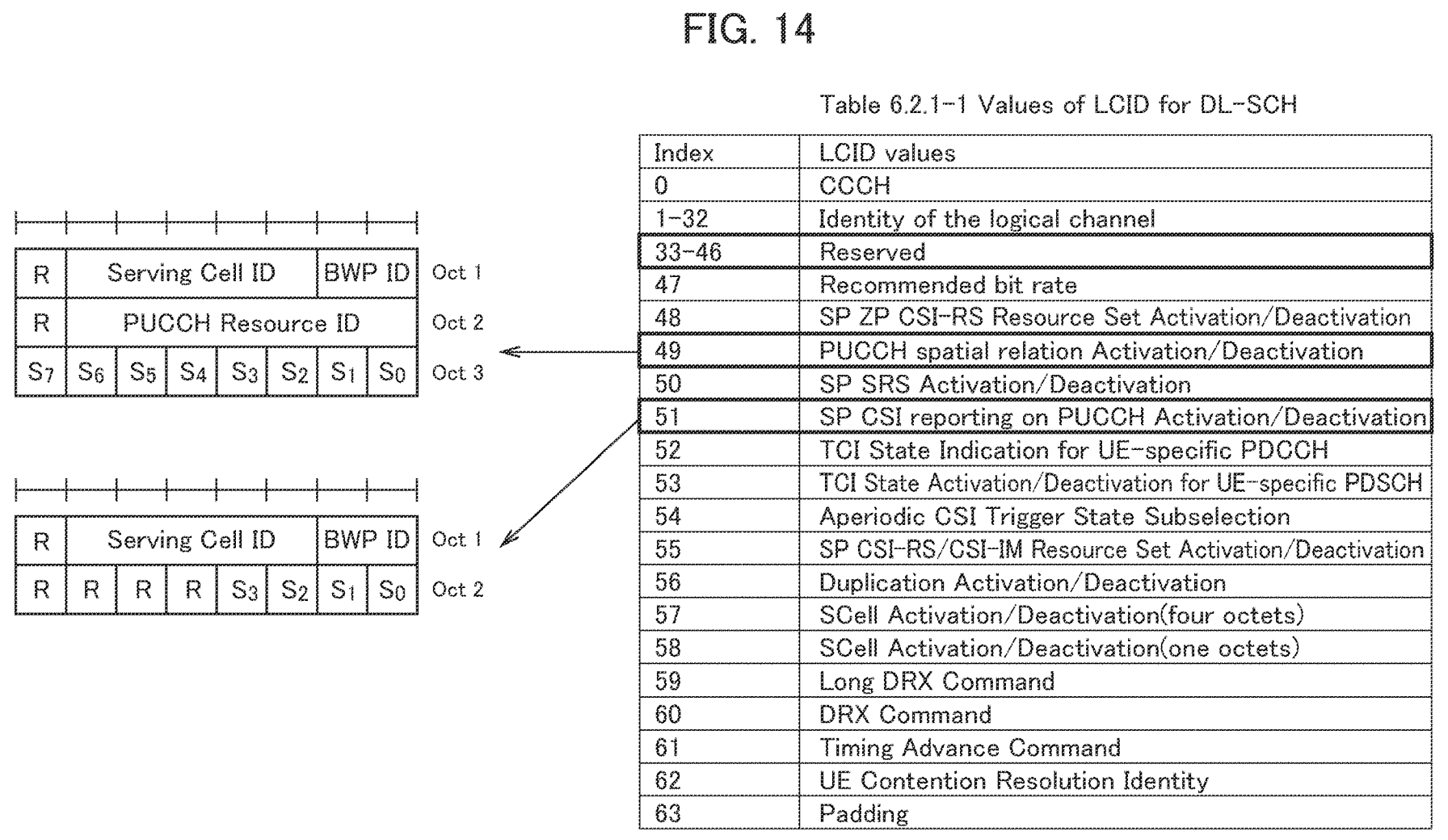

Table 6.2.1-1 Values of LCID for DL-SCH

| Index | LCID values |
|---|---|
| 0 | CCCH |
| 1-32 | Identity of the logical channel |
| 33-46 | Reserved |
| 47 | Recommended bit rate |
| 48 | SP ZP CSI-RS Resource Set Activation/Deactivation |
| 49 | PUCCH spatial relation Activation/Deactivation |
| 50 | SP SRS Activation/Deactivation |
| 51 | SP CSI reporting on PUCCH Activation/Deactivation |
| 52 | TCI State Indication for UE-specific PDCCH |
| 53 | TCI State Activation/Deactivation for UE-specific PDSCH |
| 54 | Aperiodic CSI Trigger State Subselection |
| 55 | SP CSI-RS/CSI-IM Resource Set Activation/Deactivation |
| 56 | Duplication Activation/Deactivation |
| 57 | SCell Activation/Deactivation(four octets) |
| 58 | SCell Activation/Deactivation(one octets) |
| 59 | Long DRX Command |
| 60 | DRX Command |
| 61 | Timing Advance Command |
| 62 | UE Contention Resolution Identity |
| 63 | Padding |

| R | Serving Cell ID | BWP ID | Oct 1 |
| R | PUCCH Resource ID | | Oct 2 |
| S7 | S6 | S5 | S4 | S3 | S2 | S1 | S0 | Oct 3 |

| R | Serving Cell ID | BWP ID | Oct 1 |
| R | R | R | S3 | S2 | S1 | S0 | Oct 2 |

TERMINAL AND METHOD FOR CONTROLLING REPETITION OF UPLINK CONTROL CHANNEL

TECHNICAL FIELD

The present disclosure relates to a terminal that performs radio communication, and particularly to a terminal that transmits an uplink control channel.

BACKGROUND ART

The 3rd Generation Partnership Project (3GPP) specifies the 5th generation mobile communication system (5G, also called New Radio (NR) or Next Generation (NG)), and the next generation called Beyond 5G or 6G has been also specified.

In Release 17 of 3GPP, Coverage Enhancement (CE) of NR is agreed as a study item (SI) (Non Patent Literature 1).

In the SI, an uplink data channel (PUSCH: Physical Uplink Shared Channel) and an uplink control channel (PUCCH: Physical Uplink Control Channel) are listed as performance improvement target channels.

As a general method for implementation of CE, known is a repetition of transmission of the channel in a time direction.

CITATION LIST

Non Patent Literature

Non Patent Literature 1: "New SID on NR coverage enhancement", RP-193240, 3GPP TSG RAN Meeting #86, 3GPP, December 2019

SUMMARY OF INVENTION

However, there are the following problems in the case of implementing CE of NR. In Release 15 and Release 16 (NR) of 3GPP, a radio base station (gNB) can sequentially transmit a plurality of antenna beams having different radiation directions while performing switching in a time domain.

However, when the plurality of antenna beams are switched in the time domain, the compatibility with the PUCCH repetition specified in NR is Poor. There are restrictions on the repetition configuration when the PUCCH repetition is combined for the plurality of antenna beams, and thus, it is difficult to design efficient resource allocation of the PUCCH repetition.

Therefore, the following disclosure has been made in view of such a situation, and aims to provide a terminal that can implement a more efficient repetition of an uplink control channel when a plurality of antenna beams from a radio base station are used.

One aspect of the present disclosure is a terminal (UE 200) including: a transmitting unit (control signal/reference signal processing unit 240) that transmits an uplink control channel corresponding to an antenna beam (beam BM) transmitted from a radio base station (gNB 100); and a control unit (control unit 270) that controls a repetition of the uplink control channel, the control unit assuming a symbol location of the repetition based on an explicit or implicit notification.

BRIEF DESCRIPTION OF DRAWINGS

FIG. 2 is a view illustrating a frequency range used in the radio communication system 10.

FIG. 5 is a view illustrating an example of a PUCCH repetition according to Release-15 and Release-16 of 3GPP.

FIG. 10 is a view illustrating a configuration example of PUCCH-Config according to Operation Example 1.

FIG. 11 is a view illustrating that the UE 200 according to Operation Example 1 assumes a mapping location of a repetition with reference to the number of beams BM.

FIG. 14 is a view illustrating a dynamic notification example of a PUCCH repetition using MAC-CE according to Operation Example 3.

DESCRIPTION OF EMBODIMENTS

Hereinafter, an embodiment will be described with reference to the drawings. Note that the same functions and configurations are denoted by the same or similar reference signs, and the description thereof will be omitted as appropriate.

(1) Overall Schematic Configuration of Radio Communication System

Figure 1:
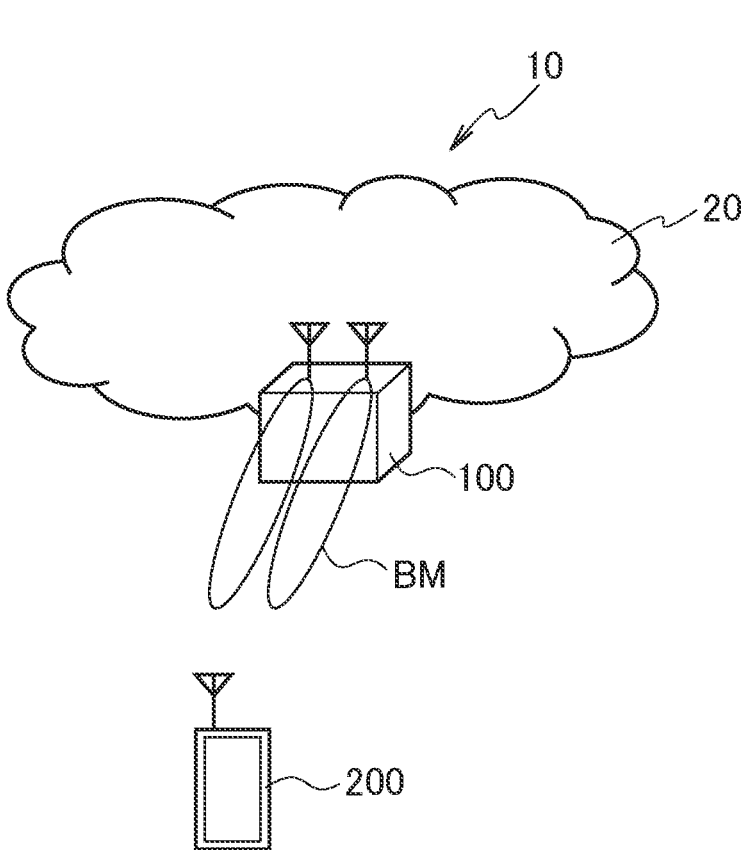
FIG. 1 is an overall schematic configuration diagram of a radio communication system 10.

FIG. 1 is an overall schematic configuration diagram of a radio communication system 10 according to the present embodiment. The radio communication system 10 is a radio communication system according to 5G New Radio (NR), and includes: a next generation-radio access network 20 (hereinafter, NG-RAN 20; and a terminal 200 (hereinafter, the UE 200, user equipment, or UE). Note that the radio communication system 10 may be a radio communication system according to a system called Beyond 5G or 6G.

The NG-RAN 20 includes a radio base station 100 (hereinafter, gNB 100). Note that a specific configuration of the radio communication system 10 including the number of gNBs and the number of UEs is not limited to the example illustrated in FIG. 1.

In practice, the NG-RAN 20 includes a plurality of NG-RAN nodes, specifically, gNBs (or ng-eNBs), and is connected to a 5G-compliant core network (5GC, not illustrated). Note that the NG-RAN 20 and 5GC may be simply expressed as a "network".

The gNB 100 is a radio base station according to 5G, and executes radio communication according to 5G with the UE 200. The gNB 100 and the UE 200 can support massive MIMO (Multiple-Input Multiple-Output) that generates an antenna beam (beam BM) having a higher directivity, carrier aggregation (CA) using a plurality of component carriers (CC) in a bundle, dual connectivity (DC) that performs simultaneous communication between the UE and each of two NG-RAN nodes, and the like by controlling a radio signal transmitted from a plurality of antenna elements.

The gNB 100 can transmit a plurality of beams BM having different transmission directions (which may be simply called directions, radiation directions, or coverage) in a space-division and time-division manner. Note that the gNB 100 may simultaneously transmit the plurality of beams BM.

In addition, the radio communication system 10 may support a plurality of frequency ranges (FR). FIG. 2 illustrates the frequency ranges used in the radio communication system 10.

As illustrated in FIG. 2, the radio communication system 10 corresponds to FR1 and FR2. A frequency band of each FR is given as follows.

FR1: 410 MHz to 7.125 GHz
FR2: 24.25 GHz to 52.6 GHz

In FR1, a sub-carrier spacing (SCS) of 15, 30, or 60 kHz is used, and a bandwidth (BW) of 5 to 100 MHz is used. FR2 is a higher frequency than FR1, SCS of 60 or 120 kHz (240 kHz may be included) is used, and s bandwidth (BW) of 50 to 400 MHz is used.

Note that SCS may be interpreted as numerology. The numerology is defined in 3GPP TS38.300 and corresponds to one subcarrier spacing in a frequency domain.

Furthermore, the radio communication system 10 may also support a frequency band higher than the frequency band of FR2. Specifically, the radio communication system 10 can support a frequency band exceeding 52.6 GHz up to 114.25 GHz.

In addition, Cyclic Prefix-Orthogonal Frequency Division Multiplexing (CP-OFDM)/Discrete Fourier Transform-Spread (DFT-S-OFDM) having a larger sub-carrier spacing (SCS) may be applied. Furthermore, DFT-S-OFDM may be applied to a downlink (DL) as well as an uplink (UL).

Figure 3:
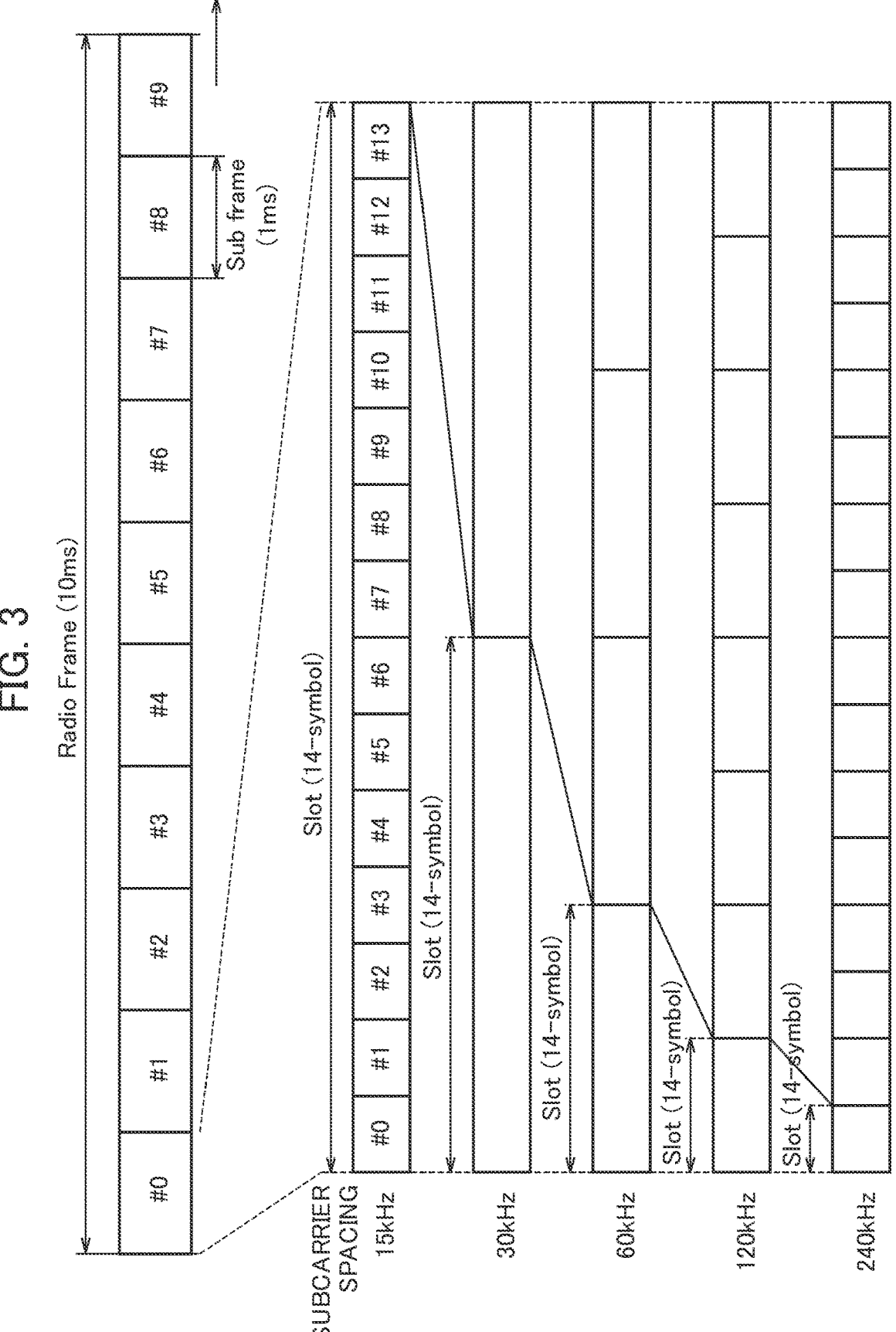
FIG. 3 is a view illustrating a configuration example of a radio frame, a subframe, and a slot used in a radio communication system 10.

FIG. 3 illustrates a configuration example of a radio frame, a subframe, and a slot used in the radio communication system 10.

As illustrated in FIG. 3, one slot is constituted by fourteen symbols (which may be called OFDM symbols). The larger (wider) the SCS is, the shorter a symbol period (and a slot period) is. Note that the number of symbols constituting one slot is not necessarily fourteen symbols (for example, 28 or 56 symbols). In addition, the number of slots per subframe may differ depending on the SCS.

Note that a time direction (t) illustrated in FIG. 3 may be called a time domain, a symbol period, a symbol time, or the like. In addition, a frequency direction may be called a frequency domain, a resource block, a subcarrier, a BWP (Bandwidth part), or the like.

In addition, the radio communication system 10 supports Coverage Enhancement (CE) that expands the coverage of a cell formed by the gNB 100. One means of CE is to improve a reception success probability by a repetition of various channels (control channels or data channels).

In particular, in the radio communication system 10, it is possible to execute a repetition of channels in the uplink (UL), specifically, an uplink control channel (PUCCH: Physical Uplink Control Channel) and an uplink data channel (PUSCH: Physical Downlink Shared Channel).

(2) Functional Block Configuration of Radio Communication System

Next, a functional block configuration of the radio communication system 10 will be described. Specifically, a functional block configuration of the UE 200 will be described.

Figure 4:
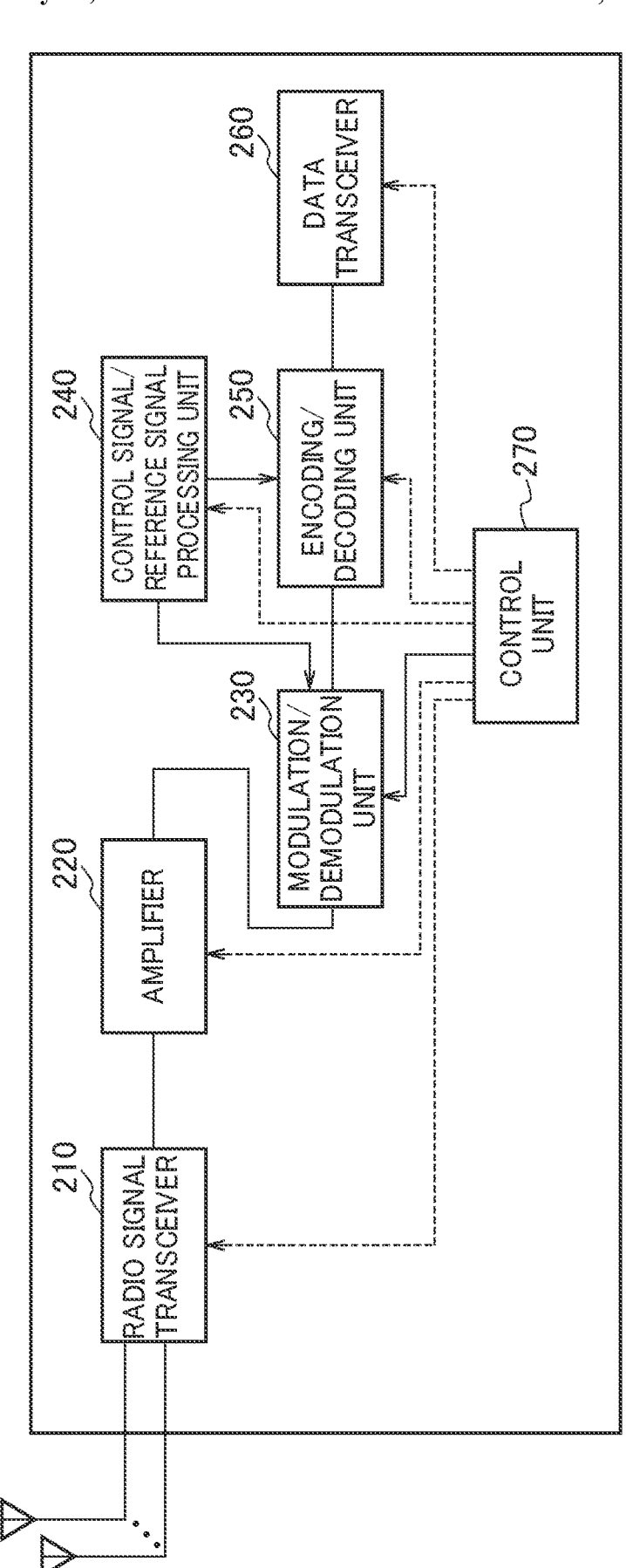
FIG. 4 is a functional block configuration diagram of an UE 200.

FIG. 4 is a functional block configuration diagram of the UE 200. As illustrated in FIG. 4, the UE 200 includes a radio signal transceiver 210, an amplifier 220, a modulation/demodulation unit 230, a control signal/reference signal processing unit 240, an encoding/decoding unit 250, a data transceiver 260, and a control unit 270.

The radio signal transceiver 210 transmits and receives a radio signal according to NR. The radio signal transceiver 210 supports Massive MIMO, CA using a plurality of CCs in a bundle, DC simultaneously performing communication between the UE and each of the two NG-RAN nodes, and the like.

In particular, the radio signal transceiver 210 can receive an SSB (SS/PBCH Block) which is a block of a synchronization signal/broadcast channel constituted by SS (Synchronization Signal) and PBCH (Physical Broadcast Channel). The SSB is mainly transmitted periodically such that the UE 200 detects a cell ID and a reception timing at the start of communication. The SSB is also used to measure the reception quality of each cell.

As a periodicity of SSB, 5, 10, 20, 40, 80, 160 milliseconds, or the like may be defined. Note that the UE 200 at the initial access may be assumed to have a periodicity of 20 milliseconds.

The network (NG-RAN 20) can notify the UE 200 of an index indication (ssb-PositionsInBurst) of an actually transmitted SSB by system information (SIB1) or radio resource control layer (RRC) signaling.

In addition, the maximum number of beams BM used for SSB transmission may be 64, but the maximum number may be expanded (for example, 256) in order to cover a certain geographical area with a narrow beam. In this case, the number of SSBs is also 256, and an index for identifying SSB (SSB index) may be a value after #64.

The SS is constituted by a primary synchronization signal (PSS: Primary SS) and a secondary synchronization signal (SSS: Secondary SS).

The PSS is a known signal that the UE 200 first attempts to detect in a cell search procedure. The SSS is a known signal transmitted to detect a physical cell ID in the cell search procedure.

The PBCH includes information necessary for the UE 200 to establish frame synchronization with an NR cell formed by the gNB 100 after detecting the SS/PBCH block, such as a radio frame number (SFN: System Frame Number), and an index for identifying symbol locations of a plurality of SS/PBCH blocks within a half frame (5 ms).

In addition, the PBCH can also include system parameter necessary to receive system information (SIB). In addition, SSB also includes a broadcast channel demodulation reference signal (DMRS for PBCH). DMRS for PBCH is a known signal transmitted to measure a radio channel condition for PBCH demodulation.

The UE 200 may assume that each SSB is associated with a beam BM having a different transmission direction (coverage). As a result, the UE 200 residing in the NR cell can receive any beam BM, acquire the SSB, and start the initial access and SSB detection/measurement.

Note that there are various SSB transmission patterns depending on SCS, the frequency range (FR), or other parameters. In addition, not all SSBs need to be transmitted, and only a few SSBs may be selectively transmitted depending on network requirements and conditions, and the UE 200 may be notified of which SSB is transmitted and which SSB is not transmitted.

The UE 200 is notified of the SSB transmission pattern by an RRC IE (Information Element) called ssb-PositionsIn-Burst described above.

The amplifier 220 is configured using a PA (Power Amplifier)/LNA (Low Noise Amplifier) or the like. The amplifier 220 amplifies a signal output from the modulation/demodulation unit 230 to a predetermined power level. In addition, the amplifier 220 amplifies an RF signal output from the radio signal transceiver 210.

The modulation/demodulation unit 230 executes data modulation/demodulation, transmission power setting, resource block allocation, and the like for each predetermined communication destination (the gNB 100 or another gNB).

As described above, CP-OFDM and DFT-S-OFDM can be applied in the present embodiment.

The control signal/reference signal processing unit 240 executes processing regarding various control signals transmitted and received by the UE 200 and processing regarding various reference signals transmitted and received by the UE 200.

Specifically, the control signal/reference signal processing unit 240 receives various control signals transmitted from the gNB 100 via a predetermined control channel, for example, a control signal of a radio resource control layer (RRC). In addition, the control signal/reference signal processing unit 240 transmits various control signals to the gNB 100 via the predetermined control channel.

In addition, the control signal/reference signal processing unit 240 executes processing using the reference signal (RS) such as a demodulation reference signal (DMRS) and a phase tracking reference signal (PTRS).

DMRS is a known reference signal (pilot signal) between a terminal-specific base station and a terminal for estimation of a fading channel used for data demodulation. PTRS is a terminal-specific reference signal that aims at estimation of phase noise which is a problem in high frequency bands.

Note that the reference signal also includes a Channel State Information-Reference Signal (CSI-RS) and a Sounding Reference Signal (SRS) in addition to DMRS and PTRS.

In addition, the channels includes control channels and data channels. The control channels include a PDCCH (Physical Downlink Control Channel), a PUCCH (Physical Uplink Control Channel), a RACH (Random Access Channel, Downlink Control Information (DCI) including a Random Access Radio Network Temporary Identifier (RA-RNTI)), a Physical Broadcast Channel (PBCH), and the like.

In addition, the data channels include a PDSCH (Physical Downlink Shared Channel), a PUSCH (Physical Downlink Shared Channel), and the like. The data means data transmitted via a data channel.

In particular, the control signal/reference signal processing unit 240 supports CE, and thus, can execute the repetition of PUCCH and PUSCH in the present embodiment.

PUCCH may be interpreted as a UL physical channel used for transmission of UCI (Uplink Control Information). UCI can be transmitted by either PUCCH or PUSCH depending on a situation. Note that DCI (Downlink Control Information) may be constantly transmitted by PDCCH and is not necessarily transmitted by PDSCH.

UCI may include at least any of ACK/NACK of hybrid ARQ (HARQ: Hybrid automatic repeat request) and a scheduling request (SR) and Channel State Information (CSI) from the UE 200.

In addition, the timing and radio resource for transmitting PUCCH may be controlled by DCI similarly in the data channel.

In addition, five types of formats may be specified for PUCCH. Specifically, formats in which any of the number of information bits transmitted by PUCCH and the number of symbols (OFDM symbols) allocated to PUCCH is different may be specified.

More specifically, PUCCH Formats (hereinafter, PFs) 1, 3, and 4 are called long formats, and the number of symbols is four to fourteen. PFs 0 and 2 are called short formats, and the number of symbols is one or two.

The number of information bits in PFs 0 and 1 is two bits or less 2), and the number of information bits of PF 2 to PF 4 is more than two bits (>2).

In the present embodiment, the gNB 100 can transmit a plurality of antenna beams, specifically, the beam BM as described above. The control signal/reference signal processing unit 240 can transmit PUCCH corresponding to the beam BM transmitted from the gNB 100. In the present embodiment, the control signal/reference signal processing unit 240 constitutes a transmitting unit.

The PUCCH corresponding to beam BM may mean PUCCH transmitted using a time resource corresponding to the beam BM selected when the gNB 100 transmits a signal since time and frequency resources to allocate PUCCH to each of the plurality of antenna beams have been determined. That is, the control signal/reference signal processing unit 240 can transmit PUCCH (including repetition) using the time resource corresponding to the beam BM selected when the gNB 100 transmits the signal.

In addition, in the present embodiment, the control signal/reference signal processing unit 240 can receive repetition transmission information, which indicates at least any of necessity of the repetition of PUCCH and a symbol location of the repetition, from the gNB 100. In the present embodiment, the control signal/reference signal processing unit 240 constitutes a receiving unit.

Specifically, the control signal/reference signal processing unit 240 can receive PUCCH-Config included in system information (specifically, SIB1) transmitted from the gNB 100. PUCCH-Config may be included in BWP-UplinkDedicated, and BWP-UplinkDedicated may be included in ServingCellConfig. In addition, ServingCellConfig may be included in SIB1.

PUCCH-Config may include a start symbol location (startingSymbolIndexforRepetition) of a repetition and a difference (slotOffset) between adjacent repetitions (repetition n and repetition n+1) in the time direction. However, slotOffset is not necessarily essential. A configuration example of PUCCH-Config will be described later.

In addition, the control signal/reference signal processing unit 240 can also receive information that dynamically notifies the content of the PUCCH repetition.

Specifically, the control signal/reference signal processing unit 240 can receive DCI or MAC-CE (Control Element) that notifies a resource location of a repetition, the presence or absence and/or the number of repetitions, and the like. Configuration examples of DCI and MAC-CE will be described later.

The encoding/decoding unit 250 executes data division/concatenation, channel coding/decoding, and the like for each predetermined communication destination (the gNB 100 or another gNB).

Specifically, the encoding/decoding unit 250 divides data output from the data transceiver 260 into a predetermined size, and executes channel coding on the divided data. In addition, the encoding/decoding unit 250 decodes the data output from the modulation/demodulation unit 230 and concatenates the decoded data.

The data transceiver 260 executes transmission and reception of Protocol Data Unit (PDU) and Service Data Unit (SDU). Specifically, the data transceiver 260 executes assembling/disassembling of PDU/SDU in a plurality of layers (a medium access control layer (MAC), a radio link control layer (RLC), a packet data convergence protocol layer (PDCP), and the like). In addition, the data transceiver 260 executes error correction and retransmission control of data based on HARQ.

The control unit 270 controls the respective functional blocks constituting the UE 200. In particular, the control unit 270 controls the PUCCH repetition in the present embodiment.

Specifically, the control unit 270 can assume a symbol location of the PUCCH repetition based on an explicit or implicit notification. More specifically, the control unit 270 can assume the symbol location on a slot (see FIG. 3) (or on a radio frame or a subframe) used for the PUCCH repetition. Note that the symbol location may be a start symbol location of a repetition, or may be a specific symbol used for a repetition (for example, a final symbol location).

As the explicit notification, for example, the control unit 270 may assume the symbol location of the PUCCH repetition based on PUCCH-Config as described above. Alternatively, the control unit 270 may assume the symbol location of the PUCCH repetition based on DCI or MAC-CE as described above.

As the implicit notification, for example, the control unit 270 may assume the symbol location of the PUCCH repetition based on the number of the beams BM transmitted by the gNB 100 (which can be determined from ssb-PositionsInBurst).

Specifically, the control unit 270 can assume that PUCCHs corresponding to the number of beams BM transmitted by the gNB 100 are consecutively arranged on the slots.

In addition, when the PUCCH repetition is configured (nrofSlots: n2, n4, and n8 in PUCCH-Config), the control unit 270 may assume that PUCCHs corresponding to the number of beams BMs×the number of repetitions are consecutively arranged on the slots, and assume that the PUCCH repetition timing of the UE 200 exists at a timing after the number of the beams BM. The number of slots of PUCCHs in PFs 1, 3, and 4 is indicated by nrofSlots. A more specific example of assuming the PUCCH and repetition location will be described later.

In addition, the control unit 270 may assume information indicating a spacing between repetitions of a plurality of PUCCHs based on an explicit or implicit notification.

Specifically, the control unit 270 may assume a slot difference (difference between repetition n and repetition n+1) between repetitions that is common for each repetition or for a plurality of repetitions. As described above, the slot difference may be explicitly notified by PUCCH-Config, or may be implicitly assumed based on a predetermined slot difference.

Furthermore, the control unit 270 may assume that at least any of PUCCH and the repetition is allocated to an uplink resource corresponding to another beam BM (proximity antenna beam) whose transmission direction is adjacent to that of the beam BM in order to implement a more efficient PUCCH repetition.

The control unit 270 may assume that at least any of PUCCH and the repetition is allocated to the uplink resource corresponding to the proximity antenna beam, for example, according to bitmap information transmitted from the gNB 100. The bitmap information may be included in PUCCH-Config or may be notified to the UE 200 by another information element. Alternatively, the control unit 270 may assume the uplink resource corresponding to the proximity antenna beam based on the initial configuration or the like without depending on the bitmap information.

The plurality of beams BM transmitted by the gNB 100 are transmitted (radiated) in different directions in at least any of the horizontal direction and the vertical direction, and the proximity antenna beam may be interpreted as an antenna beam that is adjacent to the beam BM received by the UE 200 in at least any of the horizontal direction and the vertical direction as the radiation direction.

However, the proximity antenna beam is not necessarily limited to the antenna beam adjacent to the beam BM received by the UE 200, and may be an antenna beam further adjacent to an adjacent antenna beam, for example.

(3) Operation of Radio Communication System

Next, the operation of the radio communication system 10 will be described. Specifically, an operation related to the PUCCH repetition by the UE 200 will be described.

(3.1) Basic Operation

First, an operation related to the PUCCH repetition according to Release-15 and 16 of 3GPP will be described. FIG. 5 illustrates an example of the PUCCH repetition according to Release-15, 16 of 3GPP.

As illustrated in FIG. 5, the PUCCH repetition is supported in the case of PUCCH Formats (PFs) 1, 3, and 4. The repetitions are allocated to consecutive slots and can be configured using a plurality of consecutive symbols, but the same PUCCH symbol is allocated to the respective slots. In addition, frequency hopping for each slot is supported (the vertical direction of a frame line corresponds to the frequency direction).

The repetition is not supported in PFs 0 and 2. Note that one frame in FIG. 5 corresponds to one symbol (hereinafter, the same). FIG. 5 illustrates an example of four symbols for PFs 1, 3, and 4 (long format) and two symbols for PFs 0 and 2 (short format).

In addition, the lower part of FIG. 5 illustrates an example of mapping between the beam BM and PUCCH when the gNB 100 (BS) emits eight beams BM (#0 to 7) in different directions (horizontal direction).

In the present embodiment, the coverage enhancement (CE) is supported as described above. In order to implement CE, it is desirable to improve the performance of PUCCH.

As a method for implementation of CE, the PUCCH repetition in the time direction can be considered. However, when the gNB 100 supports a plurality of antenna beams while following the PUCCH specifications of Release-15, 16 of 3GPP, there are restrictions on the PUCCH repetition configuration as in the example illustrated in the lower part of FIG. 5, so that it is difficult to implement a more efficient PUCCH repetition configuration.

Hereinafter, operation examples of the network and the UE 200 that can solve such restrictions and implement the more efficient PUCCH repetition will be described.

(3.2) Overview of Operations

In the following operation examples, the PUCCH repetition is more efficiently mapped to the plurality of beams BM transmitted from the gNB 100.

Specifically, Operation Examples 1 to 3 implement efficient mapping of the PUCCH repetition to the beam BM.

(Operation Example 1): Since a repetition of PUCCH (hereinafter simply abbreviated as the repetition as appropriate) is mapped to a plurality of beams BM, the following operations are possible.

(i): Support a repetition in PFs 0 and 2

(ii): Configure a repetition start symbol (iii): Configure a slot of the repetition symbol Note that (i) to (iii) may be explicitly or implicitly notified from the network to the UE 200.

(Operation Example 2): Allocate PUCCH and the repetition to uplink resources that are adjacent to a specific antenna beam and correspond to different antenna beams.

In this case, a resource allocation method in the time direction and the frequency direction may be configured as follows.

(Time Direction)

(i): Configure PUCCH and repetition resources by the same method as in Operation Example 1

(ii): Associate a repetition with an SSB index (Frequency Direction)

(i): Configure frequency hopping between repetitions instead of frequency hopping between slots (ii): Configure an arbitrary resource block (RB) for each repetition (Operation Example 3): Dynamically configure a repetition method.

(3.2.1) Operation Example 1

In the present operation example, a repetition is mapped to the beam BM (antenna beam) from a plurality of the gNBs 100. Specifically, the following mapping configuration example is given.

Figure 6:
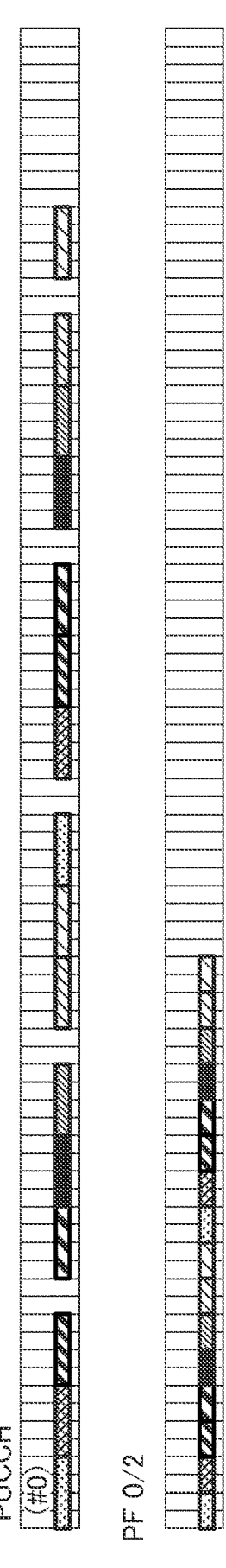
FIG. 6 is a view illustrating a configuration example (Part 1) of repetition mapping to a plurality of antenna beams according to Operation Example 1.
Figure 7:
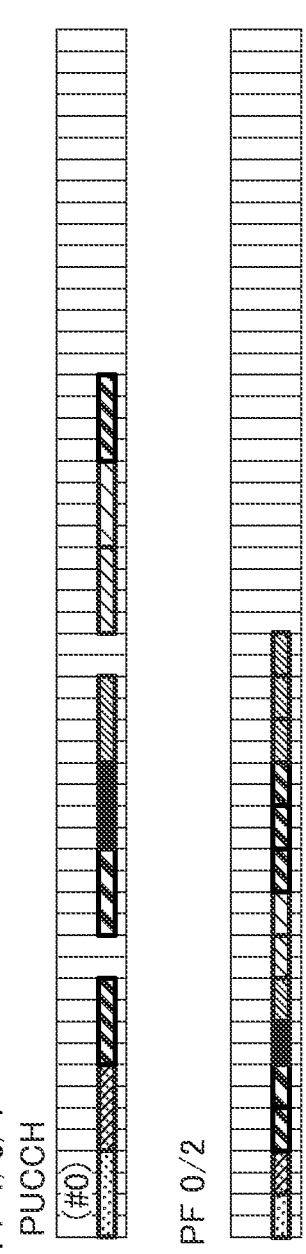
FIG. 7 is a view illustrating a configuration example (Part 2) of the repetition mapping to the plurality of antenna beams according to Operation Example 1.
Figure 8:
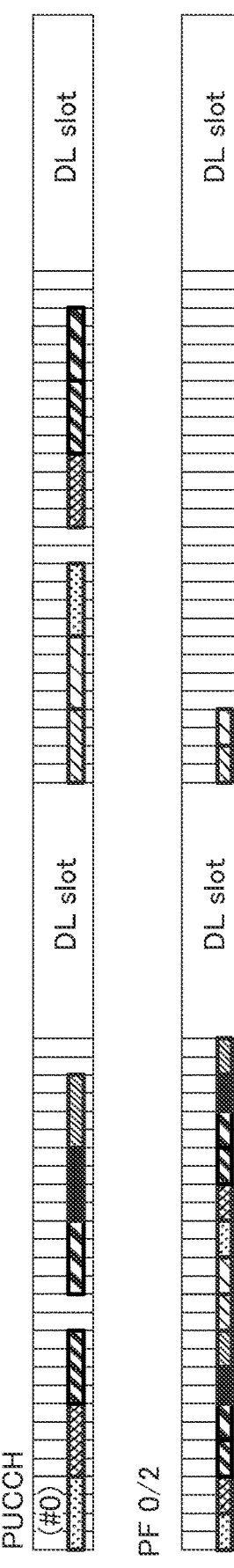
FIG. 8 is a view illustrating a configuration example (Part 3) of the repetition mapping to the plurality of antenna beams according to Operation Example 1.

FIG. 6 illustrates a configuration example (Part 1) of repetition mapping to a plurality of antenna beams according to Operation Example 1. FIG. 7 illustrates a configuration example (Part 2) of the repetition mapping to the plurality of antenna beams according to Operation Example 1. FIG. 8 illustrates a configuration example (Part 3) of the repetition mapping to the plurality of antenna beams according to Operation Example 1.

Patterns in FIGS. 6 to 8 correspond to the beams BM (#0 to 7) illustrated in FIG. 5. In addition, such mapping may be supported in PFs 1, 3, and 4 (long format) and PFs 0 and (short format) as illustrated in FIGS. 6 to 8.

In the configuration example (Part 1) of FIG. 6, PUCCHs (including repetitions) are repeatedly mapped to the consecutive beams BM of #0 to 7.

In the configuration example (Part 2) of FIG. 7, PUCCHs (including repetitions) are repeatedly mapped to the consecutive beams BM of #0 to 7, and PUCCH for which a repetition is required is mapped to an empty symbol. For example, in the case of PFs 1, 3, and 4, one PUCCH (four symbols) that is the last (rightmost) in the time direction is mapped to the beam BM of #3. Similarly, in the case of PFs 0 and 2, the last six PUCCHs (two symbols) are mapped to the beams BM of #3 and 6.

In the configuration example (Part 3) of FIG. 8, PUCCHs (including repetitions) are repeatedly mapped to the consecutive beams BM of #0 to 7, similarly to Part 1, but a downlink (DL) slot is allocated in the middle thereof. The UE 200 may assume the repetitions as illustrated in FIGS. 6 to 8.

In order to implement such mapping, a symbol (start symbol) at which a repetition is started may be specified. Specifically, a start symbol that is arbitrary for each repetition or common to a plurality of repetitions may be indicated by a symbol number or a symbol difference between repetitions.

In addition, a content regarding a slot of a repetition symbol may be specified in order to implement such mapping. Specifically, a slot difference between adjacent repetitions for each repetition or that is common for repetitions may be specified. For example, a difference (slot difference) between the repetition n and the repetition n+1 may be specified.

Figure 9:
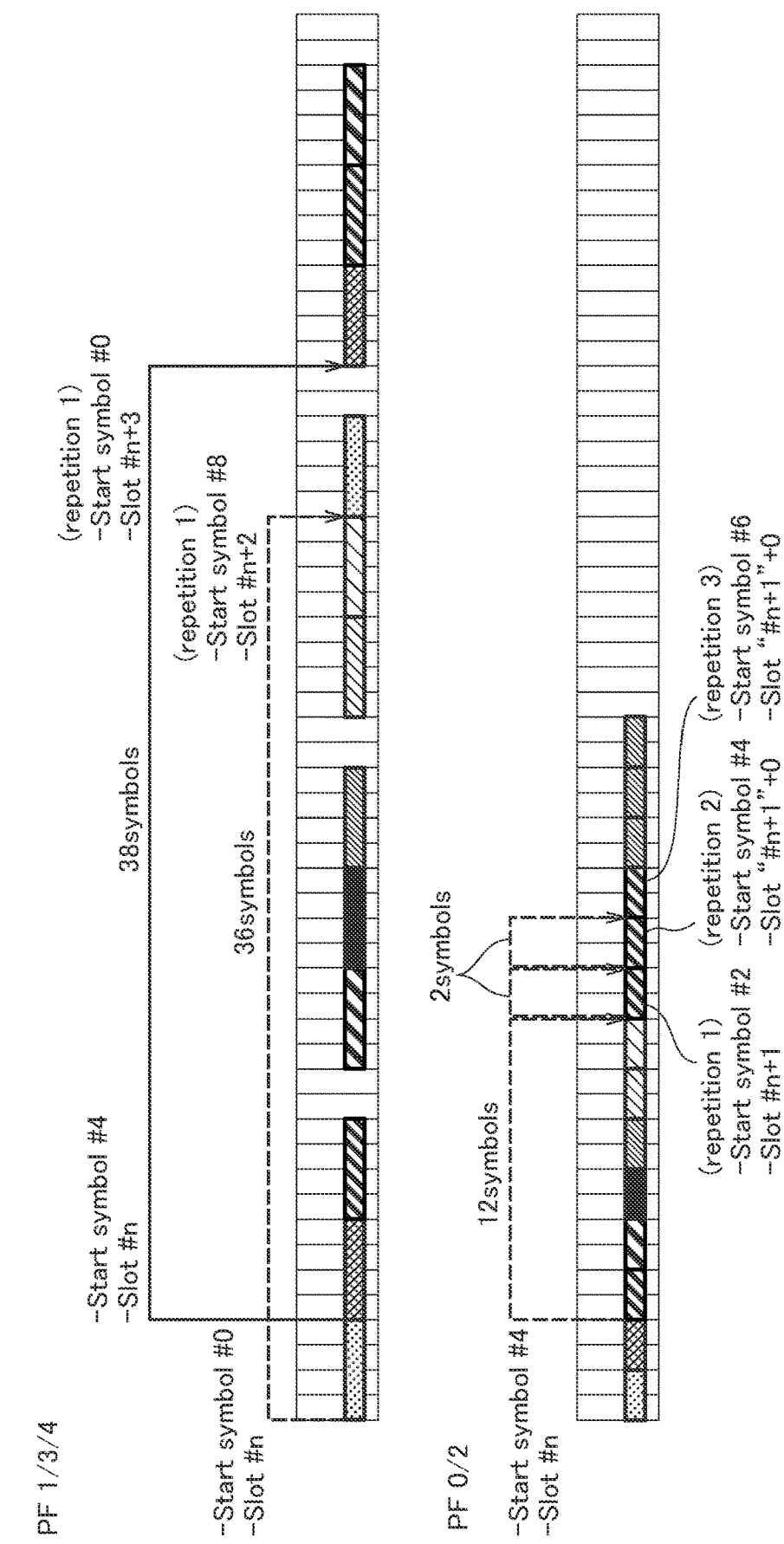
FIG. 9 is a view illustrating an example of specifying a start symbol of a repetition and a slot difference between repetitions according to Operation Example 1.

FIG. 9 illustrates an example of specifying a start symbol of a repetition and a slot difference between repetitions according to Operation Example 1.

In the example illustrated in FIG. 9, a symbol (start symbol) at which a repetition is started is designated by a combination of a symbol number and a slot (for example, Start symbol #0, Slot #n+3). However, the designation of the slot is not necessarily essential.

Alternatively, a time resource difference between repetitions (for example, 38 symbols) may be designated as illustrated in FIG. 9. Note that it suffices that the time resource difference is information indicating a spacing between adjacent repetitions in the time direction, and the time resource difference may be designated using a slot as a reference or may be designated using a symbol as a reference.

(3.2.1.1) Explicit Notification Example

The UE 200 may assume the repetition mapping as described above, but the assumption may be performed according to an explicit notification from the network.

For example, the NG-RAN 20 (specifically, the gNB 100) can explicitly notify information on the repetition mapping using PUCCH-Config.

FIG. 10 illustrates a configuration example of PUCCH-Config according to Operation Example 1. As illustrated in FIG. 10, the information about the repetition mapping may be added to a field of PUCCH-Resource or a field of PUCCH-format1, PUCCH-format2, PUCCHformat3, and PUCCH-format4 included in PUCCH-Config.

Specifically, a start symbol (startingSymbolIndexforRepetition) that is common to a plurality of repetitions and a slot difference (slotOffset) between repetitions may be included in the PUCCH-Resource field or the PUCCH-format field (see a solid-line frame portion).

In addition, when a start symbol for each repetition is specified, start symbols (startingSymbolIndexforRepetition1 to 3) and each slot difference (slotOffset1 to 3) between repetitions may be included (see a dotted-line frame portion).

(3.2.1.2) Implicit Notification Example

In addition, the UE 200 may assume the repetition mapping as described above according to an implicit notification instead of the explicit notification using PUCCH-Config as described above.

For example, the UE 200 may assume a mapping location of a repetition with reference to the number of beams BM transmitted by the gNB 100.

FIG. 11 is a view illustrating that the UE 200 according to Operation Example 1 assumes the mapping location of the repetition with reference to the number of beams BM.

As illustrated in FIG. 11, the UE 200 may assume that PUCCHs are consecutively arranged according to the number (8) of the beams BM based on the number of beams BM (which can be determined from ssb-PositionsInBurst).

In addition, when the PUCCH repetition is configured (in the case of nrofSlots: n2, n4, n8 in PUCCH-Config), the UE 200 may assume that PUCCHs corresponding to the number of beams BM×the number of repetitions are consecutively arranged on the slots, and may assume that a PUCCH repetition timing to which the beam BM received by the UE 200 has been mapped exists at a timing after the number of the beams BM.

The repetition timing (Start symbol index) may be derived from a start symbol (startingSymbolIndex) of PUCCH, the number of symbols (noofSymbols), and the like included in PUCCH-Config as illustrated in FIG. 11.

Specifically, the Start symbol index can be derived by startingSymbolIndex+{A mod 14}. As illustrated in FIG. 11, A is the number of symbols between repetitions (#n and #n+1). In addition, A may be derived using values of B to F as illustrated in FIG. 11.

Note that a DL slot may be considered when the DL slot is inserted between PUCCH slots arranged consecutively. For example, the number of DL slots may be added to Slot #n+C.

(3.2.2) Operation Example 2

In the present operation example, the PUCCH and repetitions are allocated to the PUCCH resources using different antenna beams which are adjacent to a specific antenna beam (for example, the antenna beam used for transmission of SSB received by the UE 200).

As described above, the resources of PUCCH and repetitions may be configured by the same method as in Operation Example 1, and the repetition may be associated (linked) with the SSB index.

Figure 12:
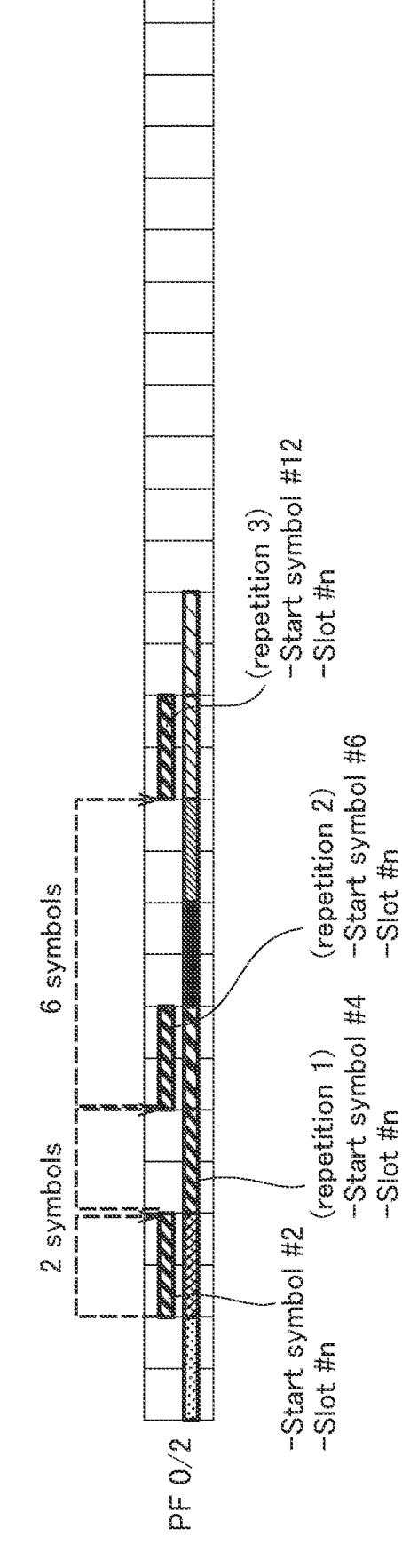
FIG. 12 is a view illustrating an example of a relationship between an antenna beam and a PUCCH repetition according to Operation Example 2.

FIG. 12 illustrates an example of a relationship between an antenna beam and a PUCCH repetition according to Operation Example 2. The UE 200 may determine that PUCCHs are consecutively arranged on the slots by the number of the beams BM transmitted by the gNB 100 (which can be determined from ssb-PositionsInBurst).

As illustrated in FIG. 12, when the SSB index is #2 (that is, in the case of the antenna beam of #2), the gNB 100 can designate #1, 3, and 6 as target antenna beams for repetitions using a bitmap, for example. The UE 200 may transmits the repetition at locations (slot or symbol) of PUCCH resources mapped to the antenna beams #1, 3, and 6 based on the bitmap when receiving the antenna beam of #2.

Alternatively, the UE 200 may use a higher SSB (may be plural) having high measurement quality as a reference to transmit the repetition at locations of PUCCH resources using different antenna beams which are adjacent to the antenna beam used to transmit the SSB based on a measurement result of SSB.

Note that an SSB having the measurement quality exceeding a predetermined threshold may be used as a reference, instead of the higher SSB having the high measurement quality.

In addition, frequency hopping between repetitions may be configured, instead of frequency hopping between slots, in the frequency direction in the present operation example.

Specifically, inter-repetition frequency hopping may be configured instead of interslotFrequencyHopping. In the inter-repetition frequency hopping, a frequency location changes in the even-numbered or odd-numbered locations as in the interslotFrequencyHopping. An odd-numbered RB location may be configured by an offset from PRB-ID or starting PRB as in the secondHopPRB. The secondHopPRB is also included in the PUCCH-Config and means an index of a first PRB (Physical Resource Block) after frequency hopping (second hop) of PUCCH.

In addition, any RB may be configured for each repetition as the configuring in the frequency direction. As a configuring method, for example, an RB location for each repetition may be configured as the content of UCCH-Resource included in PUCCH-Config.

The UE 200 may report the following capability, for example, to the network regarding the configuration of the repetition.

Possibility of a PUCCH repetition
Number of available repetitions
Possibility of assumption of consecutive arrangement of PUCCHs (based on an implicit notification)
In addition, the UE 200 may report a frequency supported by the UE 200 to the network by any of the following methods.
Report whether all frequencies can be handled together (availability as the UE 200)
Report availability for each frequency
Report availability for each of FR1 and FR2
Furthermore, the UE 200 may report a duplex system supported by the UE 200 to the network by any of the following methods.
Report availability of a full duplex system as the UE 200
Report availability for each duplex system (TDD/FDD)

(3.2.3) Operation Example 3

In Operation Example 1 and Operation Example 2, the PUCCH repetition is decided by a semi-static notification, but the method and/or the content of the repetition may be dynamically configured.

For example, in the case of Operation Example 1, the repetition may be dynamically configured by the following method.

A location of a resource used for a repetition is notified explicitly or implicitly.
The gNB 100 dynamically notifies the UE 200 of the presence or absence and/or the number of repetitions (corresponding to nrofSlots) according to a reception status of PUCCH from the UE 200.
In addition, in the case of Operation Example 2, the repetition may be dynamically configured by the following method.
The UE 200 assumes that PUCCHs are consecutively arranged as many as the number of antenna beams (which can be determined from ssb-PositionsInBurst).
The gNB 100 dynamically notifies the UE 200 of necessity of a repetition, and/or a location of a repetition (the location associated with an SSB index).
Such a dynamic notification can be implemented by DCI or MAC-CE as described above. For example, the notification may be implemented using DCI format 1_0 or 1_1, MAC-CE, or a combination thereof.

Figure 13:
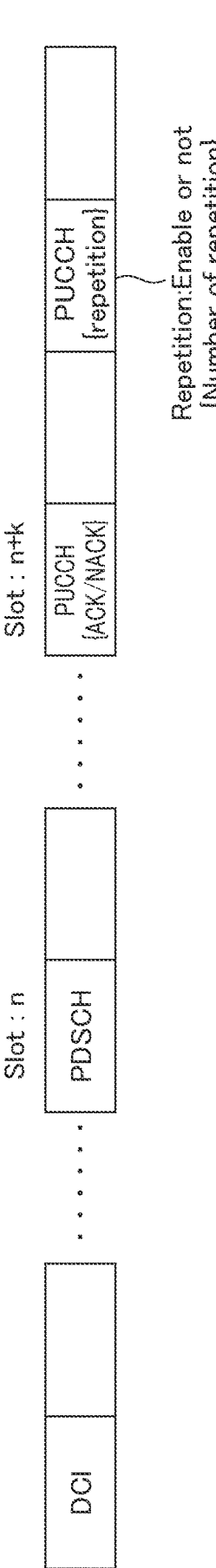
FIG. 13 is a view illustrating a dynamic notification example of a PUCCH repetition using DCI format 1_0 or 1_1 according to Operation Example 3.

FIG. 13 is a view illustrating a dynamic notification example of a PUCCH repetition using DCI format 1_0 or 1_1 according to Operation Example 3.

As illustrated in FIG. 13, in the case of using DCI format 1_0 or 1_1, it is possible to designate the presence or absence and/or the number of repetitions in addition to a PUCCH resource indicator and a PDSCH-to-HARQ feedback timing indicator (k).

FIG. 14 is a view illustrating a dynamic notification example of a PUCCH repetition using MAC-CE according to Operation Example 3.

As illustrated in FIG. 14, the presence or absence and/or the number of repetitions can be designated using a reserved bit (R) of a reserved index of MAC-CE, PUCCHspatialrelationActivation/Deactivation, or SPCSIreportingonPUCCHActivation/Deactivation.

(4) Operation/Effect

According to the above-described embodiment, the following operational effects can be obtained. Specifically, the UE 200 can control the PUCCH repetition and can assume a location of a start symbol of a repetition based on an explicit or implicit notification.

Therefore, the UE 200 may assume a more efficient repetition in consideration of compatibility with the plurality of beams BM based on the notification. That is, the UE 200 can implement a more efficient PUCCH repetition when a plurality of antenna beams from the gNB 100 are used.

In the present embodiment, the UE 200 may assume the information indicating the spacing between the plurality of repetitions based on the explicit or implicit notification. Therefore, the UE 200 can easily assume the location of the repetition based on the information indicating the spacing between the repetitions, for example, the slot difference.

In the present embodiment, the UE 200 may assume that at least any of PUCCH and the repetition is allocated to the uplink resource corresponding to the proximity antenna beam which is adjacent to a specific antenna beam transmitted from the gNB 100 in the transmission direction.

Therefore, it is possible to increase the probability of successful reception of PUCCH in the gNB 100, and it is possible to implement CE more reliably.

In the present embodiment, the UE 200 can receive, from the gNB 100, the repetition transmission information indicating at least any of the necessity of the repetition and the symbol location of the repetition. As described above, the repetition transmission information can be transmitted by DCI or MAC-CE.

Therefore, the UE 200 can assume an appropriate repetition based on the received repetition transmission information.

In this manner, the efficient PUCCH repetition can be implemented according to the network including the UE 200 and the gNB 100, which can contribute to provision of stable CE.

(5) Other Embodiments

Although the embodiment has been described as above, it is obvious to those skilled in the art that the invention is not limited to the description of the embodiment and various modifications and improvements can be made.

For example, CE is assumed in the above-described embodiment, but the above PUCCH repetition may be executed regardless of provision of CE.

In addition, PUCCH is taken as an example in the above-described embodiment, but a repetition may be executed for an uplink control channel when there is the uplink control channel for transmitting UCI or the like.

In addition, the block configuration diagram used for the description of the above embodiment (FIG. 4) illustrates the blocks in units of functions. Those functional blocks (components) can be implemented by a desired combination of at least one of hardware and software. In addition, a method for implementing each functional block is not particularly limited. That is, each functional block may be implemented by one physically or logically coupled device, or may be implemented by directly or indirectly connecting two or more physically or logically separated devices (for example, in a wired or wireless manner), and these plural devices. The functional blocks may be implemented by combining software with the one device or the plural devices described above.

Functions include determining, deciding, judging, calculating, computing, processing, deriving, investigating, searching, ascertaining, receiving, transmitting, output, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, a functional block (component) that causes transmitting to function is called a transmitting unit or a transmitter. An implementation method for any of the above functions is not particularly limited to any one method as described above.

Figure 15:
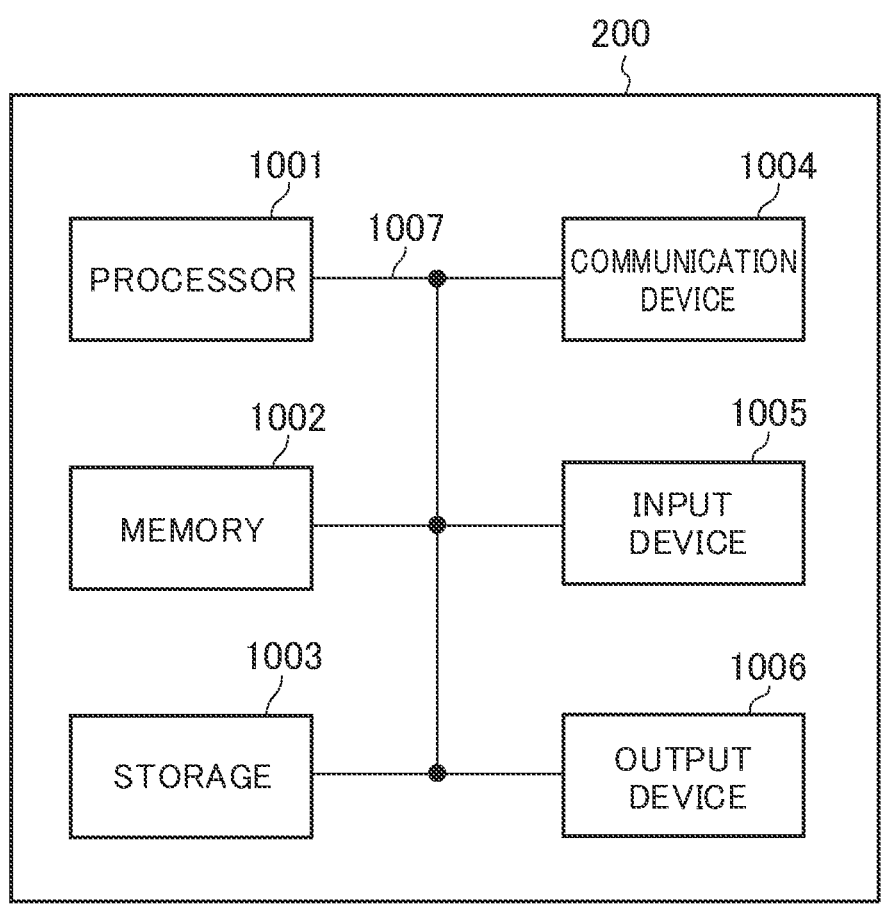
FIG. 15 is a diagram illustrating an example of a hardware configuration of the UE 200.

Furthermore, the UE 200 described above can function as a computer that performs the processing of the radio communication method of the present disclosure. FIG. 15 is a diagram illustrating an example of a hardware configuration of the UE 200. As illustrated in FIG. 15, the UE 200 can be configured as a computer device including a processor 1001, a memory 1002, a storage 1003, a communication device 1004, an input device 1005, an output device 1006, a bus 1007, and the like.

Note that the term "device" can be replaced with a circuit, device, unit, and the like in the following explanation. The hardware configuration of the device can be configured to include one or a plurality of the devices illustrated in the drawings, or can be configured by without including some of the devices.

The functional blocks of the UE 200 (see FIG. 4) can be implemented by any of hardware elements of the computer device or a desired combination of the hardware elements.

Moreover, various functions of the UE 200 are realized by loading a predetermined software (program) on hardware such as the processor 1001 and the memory 1002 to perform operations by the processor 1001, and by controlling communication via the communication device 1004, and controlling reading and/or writing of data on the memory 1002 and the storage 1003.

The processor 1001, for example, operates an operating system to control the entire computer. The processor 1001 can be configured with a central processing unit (CPU) including an interface with a peripheral device, a control device, a computing device, a register, and the like.

In addition, the processor 1001 reads a program (program code), a software module, data, and the like from the storage 1003 and/or the communication device 1004 into the memory 1002, and executes various processes according to the data. As the program, a program that is capable of executing on the computer at least a part of the operation described in the above embodiment is used. Alternatively, various processes described above can be executed by one processor 1001 or can be executed simultaneously or sequentially by two or more processors 1001. The processor 1001 can be implemented using one or more chips. Note that the program can be transmitted from a network via a telecommunication line.

The memory 1002 is a computer-readable recording medium and is configured, for example, using at least one of a read only memory (ROM), an erasable programmable ROM (EPROM), an electrically erasable programmable ROM (EEPROM), a random access memory (RAM), and the like. The memory 1002 can be called a register, a cache, a main memory (main storage device), and the like. The memory 1002 can store therein a program (program codes), software modules, and the like that can execute the method according to the embodiment of the present disclosure.

The storage 1003 is a computer readable recording medium. Examples of the storage 1003 include an optical disk such as a compact disc ROM (CD-ROM), a hard disk drive, a flexible disk, a magneto-optical disk (for example, a compact disk, a digital versatile disk, Blu-ray (registered trademark) disk), a smart card, a flash memory (for example, a card, a stick, a key drive), a floppy (registered trademark) disk, a magnetic strip, and the like. The storage 1003 may be called an auxiliary storage device. The recording medium can be, for example, a database including the memory 1002 and/or the storage 1003, a server, or other appropriate medium.

The communication device 1004 is hardware (transmission/reception device) capable of performing communication between computers via at least one of a wired network and a wireless network. The communication device 1004 is also called, for example, a network device, a network controller, a network card, a communication module, and the like.

The communication device 1004 includes a high-frequency switch, a duplexer, a filter, a frequency synthesizer, and the like in order to implement, for example, at least one of Frequency Division Duplex (FDD) and Time Division Duplex (TDD).

The input device 1005 is an input device (for example, a keyboard, a mouse, a microphone, a switch, a button, a sensor, and the like) that receives input from the outside. The output device 1006 is an output device (for example, a display, a speaker, an LED lamp, and the like) that outputs data to the outside. Note that the input device 1005 and the output device 1006 may be integrated (for example, a touch screen).

In addition, the respective devices, such as the processor 1001 and the memory 1002, are connected to each other with the bus 1007 for communicating information thereamong. The bus 1007 can be configured using a single bus or can be configured using separate buses between the devices.

In addition, the device may be configured to include hardware such as a microprocessor, a digital signal processor (DSP), an application specific integrated circuit (ASIC), a programmable logic device (PLD), and a field programmable gate array (FPGA). Some or all of the functional blocks may be implemented by the hardware. For example, the processor 1001 may be implemented by using at least one of these kinds of hardware.

In addition, notification of information is not limited to that described in the above aspect/embodiment, and may be performed using a different method. For example, the notification of information may be performed by physical layer signaling (for example, downlink control information (DCI), uplink control information (UCI), upper layer signaling (for example, RRC signaling, medium access control (MAC) signaling, notification information (master information block (MIB), system information block (SIB)), other signals, or a combination of these. In addition, the RRC signaling may be called an RRC message, for example, or can be an RRC connection setup message, an RRC connection reconfiguration message, or the like.

Each of the aspects/embodiments described in the present disclosure can be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (registered trademark), GSM (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), a system using any other appropriate system, and a next-generation system that is expanded based on these. In addition, a plurality of systems may be combined (for example, a combination of at least one of the LTE and the LTE-A with the 5G).

As long as there is no inconsistency, the order of processing procedures, sequences, flowcharts, and the like of each of the aspects/embodiments described in the present disclosure may be exchanged. For example, the various steps and the sequence of the steps of the methods described above are exemplary and are not limited to the specific order described above.

The specific operation that is performed by the base station in the present disclosure may be performed by its upper node in some cases. In a network constituted by one or more network nodes having a base station, the various operations performed for communication with the terminal may be performed by at least one of the base station and other network nodes other than the base station (for example, MME, S-GW, and the like may be considered, but not limited thereto). In the above description, the example in which there is one network node other than the base station has been described; however, a combination of a plurality of other network nodes (for example, MME and S-GW) may be used.

Information and signals (information and the like) can be output from an upper layer (or lower layer) to a lower layer (or upper layer). The information may be input and output via a plurality of network nodes.

The input/output information can be stored in a specific location (for example, a memory) or can be managed in a management table. The information to be input/output can be overwritten, updated, or added. The information can be deleted after outputting. The input information can be transmitted to another device.

The determination may be made using a value (0 or 1) represented by one bit, using Boolean value (Boolean: true or false), or by comparison of numerical values (for example, comparison with a predetermined value).

Each aspect/embodiment described in the present disclosure may be used separately or in combination, or may be switched in accordance with the execution. In addition, notification of predetermined information (for example, notification of "being X") is not limited to being performed explicitly, but may be performed implicitly (for example, without notifying the predetermined information).

Regardless of being called software, firmware, middleware, a microcode, a hardware description language, or some other name, the software should be interpreted broadly to mean an instruction, an instruction set, a code, a code segment, a program code, a program, a subprogram, a software module, an application, a software application, a software package, a routine, a subroutine, an object, an executable file, an execution thread, a procedure, a function, and the like.

In addition, software, an instruction, information, and the like may be transmitted and received via a transmission medium. For example, when software is transmitted from a website, a server, or some other remote source using at least one of a wired technology (coaxial cable, optical fiber cable, twisted pair, digital subscriber line (DSL), or the like) and a wireless technology (infrared light, microwave, or the like), at least one of these wired and wireless technologies is included within the definition of the transmission medium.

The information, signals, or the like described above may be represented by using any of a variety of different technologies. For example, data, an instruction, a command, information, a signal, a bit, a symbol, a chip, or the like that can be described throughout the above description may be represented by a voltage, a current, an electromagnetic wave, a magnetic field or a magnetic particle, an optical field or a photon, or a desired combination thereof.

Note that the terms described in the present disclosure and terms necessary for understanding the present disclosure may be replaced by terms having the same or similar meanings. For example, at least one of a channel and a symbol may be a signal (signaling). In addition, the signal may be a message. In addition, a component carrier (Component Carrier: CC) may be called a carrier frequency, a cell, a frequency carrier, or the like.

The terms "system" and "network" used in the present disclosure can be used interchangeably.

In addition, the information, the parameter, and the like described in the present disclosure can be represented by an absolute value, can be expressed as a relative value from a predetermined value, or can be represented by corresponding other information. For example, the radio resource can be instructed by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information element can be identified by any suitable name, the various names assigned to these various channels and information elements shall not be restricted in any way.

In the present disclosure, it is assumed that "base station (Base Station: BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. The base station may also be referred to with the terms such as a macro cell, a small cell, a femtocell, or a pico cell.

The base station can accommodate one or more (for example, three) cells (also called sectors). In a configuration in which the base station accommodates a plurality of cells, the entire coverage area of the base station can be divided into a plurality of smaller areas. In each such a smaller area, communication service can be provided by a base station subsystem (for example, a small base station for indoor use (Remote Radio Head: RRH)).

The term "cell" or "sector" refers to a part or all of the coverage area of a base station and/or a base station subsystem that performs communication service in this coverage.

In the present disclosure, the terms "mobile station (Mobile Station: MS)", "user terminal", "user equipment (User Equipment: UE)", "terminal", and the like can be used interchangeably.

The mobile station is called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

At least one of a base station and a mobile station may be called a transmitting device, a receiving device, a communication device, or the like. Note that, at least one of a base station and a mobile station may be a device mounted on a moving body, a moving body itself, or the like. The moving body may be a vehicle (for example, a car, an airplane, or the like), a moving body that moves unmanned (for example, a drone, an automatically driven vehicle, or the like), a robot (manned type or unmanned type). Note that at least one of a base station and a mobile station can be a device that does not necessarily move during the communication operation. For example, at least one of a base station and a mobile station may be an Internet of Things (IoT) device such as a sensor.

In addition, a base station in the present disclosure may be read as a mobile station (user terminal, hereinafter the same). For example, each of the aspects/embodiments of the present disclosure may be applied to a configuration that allows communication between a base station and a mobile station to be replaced with communication among a plurality of mobile stations (for example, may be called Device-to-Device (D2D), Vehicle-to-Everything (V2X), or the like). In this case, the mobile station may have the function of the base station. In addition, the terms "uplink", "downlink" and the like may also be replaced with terms corresponding to inter-terminal communication (for example, "side"). For example, terms such as an uplink channel, and a downlink channel may be read as a side channel.

Likewise, a mobile station in the present disclosure may be read as a base station. In this case, the base station may have the function of the mobile station.

A radio frame may be constituted by one or a plurality of frames in a time domain. The one frame or each frame of the plurality of frames in the time domain may be called a subframe. A subframe may also be constituted by one or a plurality of slots in the time domain. The subframe may have a fixed time length (for example, 1 ms) that does not depend on numerology.

The numerology may be a communication parameter applied to at least one of transmission and reception of a certain signal or channel. The numerology may represent at least one of, for example, a subcarrier spacing (SCS), a bandwidth, a symbol length, a cyclic prefix length, a transmission time interval (TTI), the number of symbols per TTI, a radio frame configuration, a specific filtering process performed by the transceiver in the frequency domain, a specific windowing process performed by the transceiver in the time domain, and the like.

The slot may be constituted by one or a plurality of symbols (such as orthogonal frequency division multiplexing (OFDM)) symbols and single carrier frequency division multiple access (SC-FDMA) symbols) in the time domain. The slot may be a time unit based on the numerology.

The slot may include a plurality of mini-slots. Each mini-slot may be constituted by one or a plurality of symbols in the time domain. In addition, the mini-slot may also be called a sub-slot. The mini-slot may be constituted by fewer symbols than the slot. PDSCH (or PUSCH) transmitted in a time unit greater than the mini-slot may be called PDSCH (or PUSCH) mapping type A. The PDSCH (or PUSCH) transmitted using the mini-slot may be called PDSCH (or PUSCH) mapping type B.

All of the radio frame, the subframe, the slot, the mini-slot, and the symbol represent a time unit at the time of transmitting a signal. All of the radio frame, the subframe, the slot, the mini-slot, and the symbol may have different names corresponding to them.

For example, one subframe may be called a transmission time interval (TTI), a plurality of consecutive subframes may be called TTI, and one slot or one mini-slot may be called TTI. That is, at least one of the subframe and TTI may be a subframe (1 ms) in the existing LTE, may be a period shorter than 1 ms (for example, 1 to 13 symbols), or may be longer than 1 ms. Note that the unit representing TTI may be called a slot, a mini-slot, and the like instead of a subframe.

Here, TTI refers to, for example, a minimum time unit of scheduling in radio communication. For example, in the LTE system, the base station performs scheduling to allocate radio resources (frequency bandwidths, transmission power, and the like that can be used by each user terminal) to each user terminal in units of TTI. Note that the definition of TTI is not limited thereto.

TTI may be a transmission time unit such as a channel-encoded data packet (transport block), a code block, and a codeword, and may be a processing unit such as scheduling and link adaptation. Note that, when TTI is given, a time interval (for example, the number of symbols) at which a transport block, a code block, a codeword, and the like are actually mapped may be shorter than the TTI.

Note that, when one slot or one mini-slot is called TTI, one or more TTIs (that is, one or more slots or one or more mini-slots) may be the minimum time unit for scheduling. In addition, the number of slots (the number of mini-slots) constituting the minimum time unit of the scheduling may be controlled.

TTI having a time length of 1 ms may be called a general TTI (TTI in LTE Rel. 8-12), a normal TTI, a long TTI, a general subframe, a normal subframe, a long subframe, a slot, and the like. The TTI shorter than the general TTI may be called a shortened TTI, a short TTI, a partial TTI (partial or fractional TTI), a shortened subframe, a short subframe, a mini-slot, a sub-slot, a slot, and the like.

Note that a long TTI (for example, a general TTI, a subframe, and the like) may be replaced with TTI having a time length exceeding 1 ms, and a short TTI (for example, a shortened TTI) may be read as a TTI having a TTI length that is shorter than the long TTI and 1 ms or more.

A resource block (RB) is a resource allocation unit in the time domain and the frequency domain, and may include one or a plurality of consecutive subcarriers in the frequency domain. The number of subcarriers included in the RB may be the same regardless of the numerology, and may be twelve, for example. The number of subcarriers included in RB may be decided based on the numerology.

In addition, a time domain of RB may include one or a plurality of symbols, and may be one slot, one mini-slot, one subframe, or one TTI in length. One TTI, one subframe, and the like may be constituted by one or a plurality of resource blocks.

Note that one or a plurality of RBs may be called a physical resource block (Physical RB: PRB), a sub-carrier group (SCG), a resource element group (REG), a PRB pair, an RB pair, and the like.

In addition, the resource block may be constituted by one or a plurality of resource elements (RE). For example, one RE may be a radio resource area of one subcarrier and one symbol.

A bandwidth part (BWP) (may also be called a partial bandwidth) may represent a subset of consecutive common RBs (common resource blocks) for a certain numerology in a certain carrier. Here, the common RB may be specified by an index of RB based on a common reference point of the carrier. The PRB may be defined in a BWP and numbered within the BWP.

The BWP may include a BWP for UL (UL BWP) and a BWP for DL (DL BWP). For UE, one or more BWPs may be configured in one carrier.

At least one of the configured BWPs may be active, and UE does not necessarily assume transmission/reception of a predetermined signal/channel outside the active BWP. Note that "cell", "carrier", and the like in the present disclosure may be read as "BWP".

The structures of the radio frame, the subframe, the slot, the mini-slot, the symbol, and the like described above are merely examples. For example, the configurations such as the number of subframes included in the radio frame, the number of slots per subframe or radio frame, the number of mini-slots included in the slot, the number of symbols and RBs included in the slot or mini-slot, the number of subcarriers included in the RB, the number of symbols in the TTI, the symbol length, and the cyclic prefix (CP) length can be variously changed.

The terms "connected", "coupled", or any variations thereof, mean any direct or indirect connection or coupling between two or more elements. In addition, one or more intermediate elements may be present between two elements that are "connected" or "coupled" to each other. The coupling or connection between the elements may be physical, logical, or a combination thereof. For example, "connection" may be read as "access". In the present disclosure, two elements can be "connected" or "coupled" to each other by using at least one of one or more wires, cables, printed electrical connections, and as some non-limiting and non-exhaustive examples, by using electromagnetic energy having wavelengths in the radio frequency domain, the microwave region and light (both visible and invisible) regions, and the like.

The reference signal may be abbreviated as Reference Signal (RS) and may be called pilot (Pilot) according to applicable standards.

As used in the present disclosure, the phrase "based on" does not mean "based only on" unless explicitly stated otherwise. In other words, the phrase "based on" means both "based only on" and "based at least on".

The "means" in the configuration of each of the above devices may be replaced with "unit", "circuit", "device", and the like.

Any reference to an element using a designation such as "first", "second", and the like used in the present disclosure generally does not limit the amount or order of those elements. Such designations can be used in the present disclosure as a convenient method to distinguish between two or more elements. Thus, the reference to the first and second elements does not imply that only two elements can be adopted, or that the first element must precede the second element in some or the other manner.

In the present disclosure, the used terms "include", "including", and variants thereof are intended to be inclusive in a manner similar to the term "comprising". Furthermore, the term "or" used in the present disclosure is intended not to be an exclusive disjunction.

In the present disclosure, for example, during translation, if articles such as "a", "an", and "the" in English are added, in the present disclosure, these articles shall include plurality of nouns following these articles.

The terms "determining" and "determining" used in the present disclosure sometimes encompass a wide variety of operations. For example, "determining" and "deciding" can include judging, calculating, computing, processing, deriving, investigating, looking up, search, or inquiry (for example, search in a table, a database, or another data structure), and ascertaining which are considered as "determining" or "deciding". In addition, "determining" and "deciding" can include receiving (for example, receiving information), transmitting (for example, transmitting information), "input", "output", and "accessing" (for example, accessing data in a memory) which are considered as "determining" or "deciding". In addition, "determining" and "deciding" can include resolving, selecting, choosing, establishing, and comparing which are considered as "determining" or "deciding". That is, the "determining" and "deciding" can include any operation considered as "determining" or "deciding". In addition, "determining (deciding)" may be read as "assuming", "expecting", "considering", and the like.

In the present disclosure, the term "A and B are different" may mean "A and B are different from each other". Note that the term may mean "A and B are each different from C". Terms such as "leave", "coupled", or the like may also be interpreted in the same manner as "different".

Although the present disclosure has been described in detail above, it will be obvious to those skilled in the art that the present disclosure is not limited to the embodiments described in the present disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

REFERENCE SIGNS LIST

10 Radio communication system
20 NG-RAN
100 gNB
200 UE
210 Radio signal transceiver 220 Amplifier
230 Modulation/demodulation unit
240 Control signal/reference signal processing unit
250 Encoding/decoding unit
260 Data transceiver
270 Control unit
1001 Processor
1002 Memory
1003 Storage
1004 Communication device
1005 Input device
1006 Output device
1007 Bus

The invention claimed is:

1. A terminal comprising:
a receiver that receives downlink control information;
a transmitter that transmits an uplink control channel; and
a processor that controls a repetition of the uplink control channel in a short format of the uplink control channel,
wherein the processor assumes an interval between each uplink control channel in the repetition, and
wherein the processor dynamically configures the number of the repetitions based on the downlink control information.

2. A radio communication system including a radio base station and a terminal, wherein
the radio base station comprises a first transmitter that transmits downlink control information, and
the terminal comprises:
a receiver that receives the downlink control information;
a second transmitter that transmits an uplink control channel; and
a processor that controls a repetition of the uplink control channel in a short format of the uplink control channel,
wherein the processor assumes an interval between each uplink control channel in the repetition, and
wherein the processor dynamically configures the number of the repetitions based on the downlink control information.

3. A radio communication method in a terminal, comprising:
receiving downlink control information;
transmitting an uplink control channel; and
controlling a repetition of the uplink control channel in a short format of the uplink control channel,
wherein in the controlling, assuming an interval between each uplink control channel in the repetition, and
wherein in the controlling, dynamically configuring the number of the repetitions based on the downlink control information.

\* \* \* \* \*